UNITED STATES PATENT OFFICE.

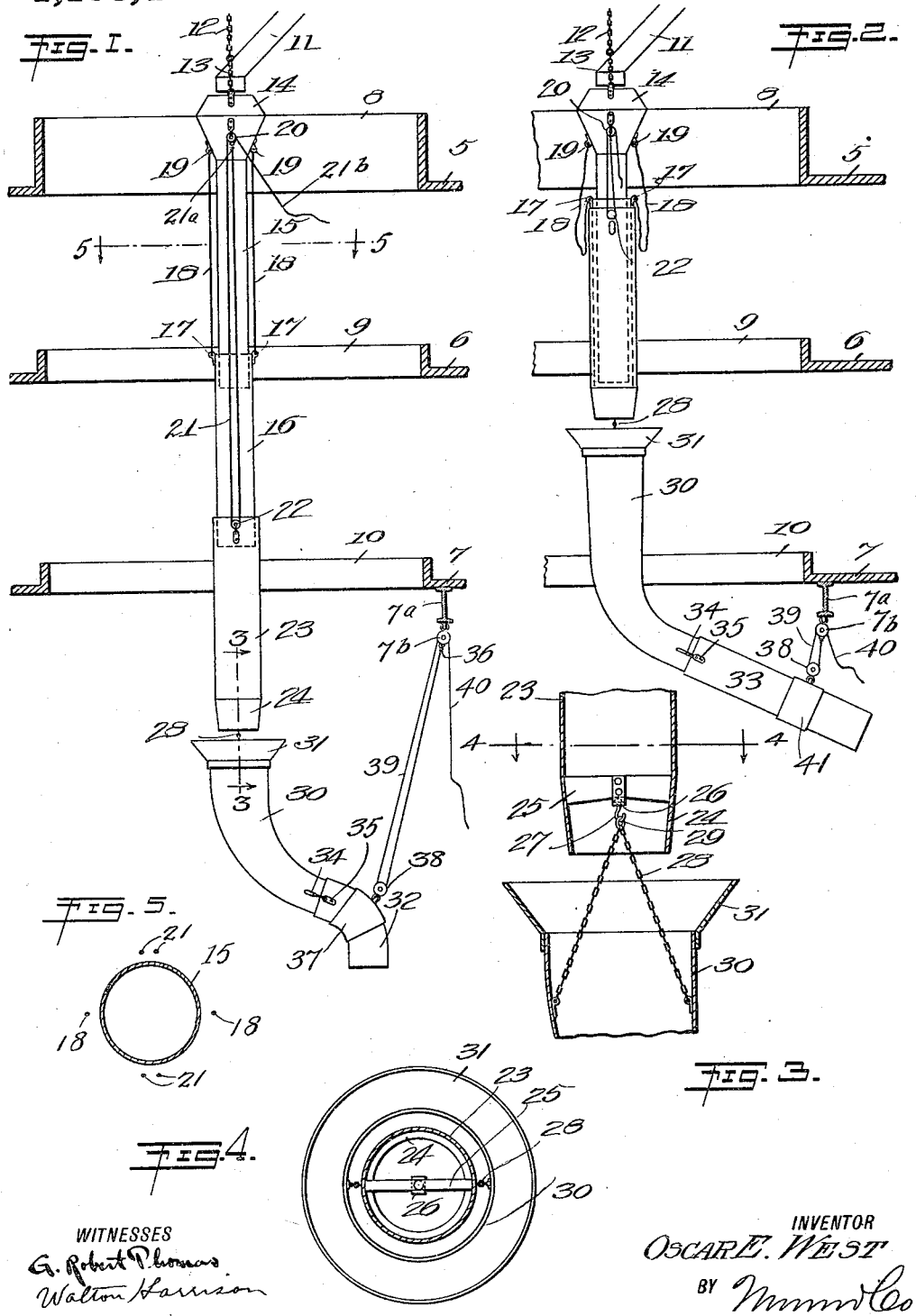

OSCAR EBBIE WEST, OF BRUNSWICK, GEORGIA.

CHUTE.

1,138,431. Specification of Letters Patent. Patented May 4, 1915.

Application filed April 22, 1913. Serial No. 762,789.

*To all whom it may concern:*

Be it known that I, OSCAR E. WEST, a subject of the King of England, and a resident of Brunswick, in the county of Glynn and State of Georgia, have made certain new and useful Improvements in Chutes, of which the following is a specification.

My invention relates to chutes, my more particular purpose being to provide a device of this character suitable for general use and of especial service for depositing loose material, such as phosphate rock, in the hold or other predetermined portion inside of a marine vessel.

Among the objects contemplated by my invention are the following:—I. To render the chute readily extensible for the purpose of enabling the operator to deposit the material at a comparatively low point, or at a predetermined higher point within the vessel. II. To enable the material to be deposited, from the lower end of the chute, in any predetermined angular direction. III. To enable certain portions of the chute to be detached and replaced by others in order to facilitate depositing the material in a variety of different directions, and at different levels. IV. To render the construction and action of the chute, and parts associated therewith, as simple and as cheap as practicable, consistently with the mechanical duties to be performed.

Reference is made to the accompanying drawing forming a part of this specification, and in which like letters indicate like parts.

Figure 1 is a fragmentary vertical section through three decks of a vessel showing my improved chute as used in connection therewith, and as extended for the purpose of depositing material some distance below the lowermost deck. Fig. 2 is a fragmentary section showing the improved chute contracted, for the purpose of depositing the material at a somewhat higher point below the lowermost deck. Fig. 3 is a section on the line 3—3 of Fig. 1, looking in the direction of the arrow, and showing the delivery pipe for discharging material from the chute. Fig. 4 is a section on the line 4—4 of Fig. 3, looking in the direction of the arrow. Fig. 5 is a section on the line 5—5 of Fig. 1 looking in the direction of the arrow.

Three decks are shown at 5, 6, 7, and are provided with doorways 8, 9, 10, these parts being of the usual or any preferred construction. A conveyer pipe is shown at 11, and delivers the material into my improved chute. A chain is shown at 12 and is provided with a loop 13. A hopper 14 is connected with this loop and hangs from the chain. A metallic cylinder 15 is secured to the lower end of the hopper and extends downwardly from the same. Another metallic cylinder 16 fits loosely over the cylinder 15, and is provided with ears 17. Connected with these ears are two cables 18, made preferably of steel. These cables at their upper ends are connected with ears 19, secured to the hopper 14. Mounted upon the hopper 14 are two sheaves 20, and engaging these sheaves are two cables 21. Each of these cables engages a sheave 22, the latter being mounted upon the cylinder 23. Each sheave 20 is provided with an eye $21^a$ to which one end of the cable 21 is attached. A portion $21^b$ of each cable 21 extends obliquely downwardly into the hold of the vessel or to any other convenient point, and is there secured in any desired manner. There are two of the cables 21 located upon opposite sides of the device. The lower end of the cylinder 23 is provided with a slightly conical portion 24. Mounted within this conical portion and extending diametrically across the same, is a supporting bar 25, which carries a stirrup 26. Revolubly supported by this stirrup is a swivel-hook 27. This swivel-hook supports a bridle chain 28, and connected with the bight of this chain is a ring 29 for forming a suitable engagement between the chain and the swivel-hook 27. The chain 29 supports a pipe section 30 provided at its upper end with a funnel-shaped portion 31.

I provide a number of pipe sections 32, 33, of somewhat different forms, as indicated in Figs. 1 and 2. These pipe sections are adapted to be readily connected up with straight pipes, whether temporarily or permanently fitted in position, and no matter at what angles such pipes are located.

For facilitating the connection of the pipe section 30 with other pipe sections 32, 33, of varying forms, I provide the pipe section 30 with eyes, one of which is shown at 34, and I also provide each pipe section 32, 33 with latches, one of which is shown at 35 for the purpose of engaging the eyes. Any other appropriate fastening members, however, may be employed for securing the pipe sections 32, 33, to the pipe section 30.

In order to facilitate the handling of the pipe sections 30, 32, 33, I mount upon a supporting beam 7ª, a sheave 7ᵇ, this sheave being provided with an eye 36. The section 32 is encircled by a broad band or strap 37. Connected with this strap is a sheave 38. A rope 39 engages the sheaves 7ᵇ, 38, and is provided with a portion 40 which may be secured to any suitable fixture. The pipe section 33 is fitted with a strap 41 to which the sheave 38 may be connected. By pulling upon the portion 40 of the rope 39, the pipe sections 30, 33, or 30, 32, may be raised or lowered as desired, and may be left in suitable position for discharging the material at any desired point. In order to cause the pipe sections 16, 18, and 23 to telescope, as indicated in Fig. 2, the rope 21ᵇ is pulled upon and after the sections are thus telescoped, the rope is secured to any suitable fixture. When the pipe sections 16 and 23 are extended as indicated in Fig. 1, they are tensioned upon the cables 18. When however, the sections are telescoped, as indicated in Fig. 2, the supporting bar 25 sustains the weight of the pipe section 16 and consequently the weight of the pipe sections 16 and 23 is supported by the rope 21ᵇ. As the swivel-hook may be readily turned relatively to the stirrup 26, the pipe section 30 may by swung around to any desired angle, and owing to its flexible support by the bridle chain 28 it may be tilted slightly if desired in order to make a neat and fairly accurate fit with the adjacent pipe section 32, 33.

All of the cylindrical members described, the hopper 14, and the various pipe sections may be made of sheet steel, but I do not limit myself to any particular material to be employed in their construction.

By adjusting the length of the cable 21, the cylinder 23 can be lowered and raised, as indicated in Figs. 1 and 2, and thus placed at any desired level within reasonable limits.

In this particular form of my invention I show three pipe sections 15, 16, 23, arranged telescopically in relation to each other. It will be understood, however, that any number of telescope members may be employed.

I do not limit myself to the precise mechanism shown, as variations may be made without departing from the spirit of my invention, the scope of which is commensurate with my claims.

I claim:—

1. A device of the character described comprising a pipe section, a hopper mounted on the upper end thereof, a chain for suspending said hopper and said pipe section, a plurality of pipe sections telescopically fitted together and to said first mentioned pipe section, means for raising and lowering the telescopic pipe sections, the lowermost telescopic pipe section having a supporting bar extending transversely across the same and adapted to engage and support the adjacent telescopic pipe section when the sections are telescoped, mechanism connected with said supporting bar for receiving and conveying materials from said lowermost pipe section, and means for adjusting said mechanism.

2. A device of the character described comprising a tubular and hollow member through which material may be conveyed, a bar extending diametrically across said hollow member, a stirrup carried by said bar, a swivel-hook mounted upon said stirrup and adapted to turn relatively to the same, a bridle chain connected with said swivel-hook, a pipe section connected with said bridle chain and suspended thereby, said pipe section being provided with a funnel-shaped portion, and means for connecting said pipe section with another pipe section to receive the material.

3. In a chute the combination of a pipe section through which material may be conveyed, the pipe section having a slightly conical lower end, a supporting bar mounted within the said lower end of the pipe section, a swivel hook supported upon the said supporting bar, a bridle chain engaging said swivel hook, and a pipe section connected with the ends of said bridle chain and suspended thereby, for receiving material from said first mentioned pipe section.

4. A device of the character described comprising a hopper for receiving material, means for suspending the same, a pipe section secured to the lower end of the hopper and extending downwardly therefrom, a plurality of pipe sections telescopically fitted together and to said first mentioned pipe section, means for raising and lowering the telescopic pipe sections, the lowermost telescopic pipe section being provided with supporting means for supporting the adjacent pipe section when the sections are telescoped, and means suspended from said supporting means for receiving and conveying material from said lowermost pipe section.

OSCAR EBBIE WEST.

Witnesses:
ALBERT FENDIG,
NEWTON W. WALKER.

Copies of this patent may be obtained for five cents each, by addressing the "Commissioner of Patents, Washington, D. C."